United States Patent
Lyu et al.

(10) Patent No.: US 12,397,446 B2
(45) Date of Patent: Aug. 26, 2025

(54) ELECTROSTATIC ATTRACTOR AND ROBOT HAND COMPRISING SAME

(71) Applicant: CREATIVE TECHNOLOGY CORPORATION, Kawasaki (JP)

(72) Inventors: Kehui Lyu, Kawasaki (JP); Yoshiaki Tatsumi, Kawasaki (JP); Shinsuke Hirano, Kawasaki (JP)

(73) Assignee: CREATIVE TECHNOLOGY CORPORATION, Kawasaki (JP)

( * ) Notice: Subject to any disclaimer, the term of this patent is extended or adjusted under 35 U.S.C. 154(b) by 254 days.

(21) Appl. No.: 18/026,538

(22) PCT Filed: Sep. 22, 2021

(86) PCT No.: PCT/JP2021/034900
§ 371 (c)(1),
(2) Date: Mar. 15, 2023

(87) PCT Pub. No.: WO2022/071070
PCT Pub. Date: Apr. 7, 2022

(65) Prior Publication Data
US 2023/0390945 A1 Dec. 7, 2023

(30) Foreign Application Priority Data
Oct. 2, 2020 (JP) ................................ 2020-167661

(51) Int. Cl.
*B25J 15/00* (2006.01)
(52) U.S. Cl.
CPC ................................ *B25J 15/0085* (2013.01)
(58) Field of Classification Search
CPC .... B25J 15/0085; B25J 15/0608; H02N 13/00
(Continued)

(56) References Cited

U.S. PATENT DOCUMENTS

| 2007/0109713 | A1* | 5/2007 | Miyaji | H02N 13/00 |
| | | | | 361/234 |
| 2007/0200467 | A1* | 8/2007 | Heydt | H04R 19/02 |
| | | | | 310/800 |

(Continued)

FOREIGN PATENT DOCUMENTS

| CN | 106796914 A | * 5/2017 | ............. H02N 13/00 |
| JP | 61-124455 A | 6/1986 | |

(Continued)

OTHER PUBLICATIONS

WO2017145103; Electroadhesive device, sysem and method for gripping; specification and drawings; Aug. 31, 2017 (Year: 2017).*

(Continued)

*Primary Examiner* — Dharti H Patel
(74) *Attorney, Agent, or Firm* — Birch, Stewart, Kolasch & Birch, LLP (57) ABSTRACT

To provide an electrostatic attractor having excellent durability and capable of achieving more reliable attraction and gripping of an object to be attracted with electrostatic force. An electrostatic attractor includes a laminate sheet formed by sequentially laminating at least a first soft polymeric organic substance, an electrode, and a second soft polymeric organic substance, and a power source device configured to apply voltage to the electrode, electrostatic force generated by applying voltage to the electrode being used to attract and grasp an object to be attracted, with one of the soft polymeric organic substances as a contact surface, in which the first soft polymeric organic substance and/or the second soft polymeric organic substance have tensile modulus of 1 MPa or more and less than 100 MPa, and volume resistivity of $1\times10^8$ to $10^{13}$ Ω·cm, and the electrode is a fiber component subjected to electroconductive treatment. A robot hand includes the electrostatic attractor.

12 Claims, 5 Drawing Sheets

(58) Field of Classification Search
USPC .......................................................... 361/234
See application file for complete search history.

(56) References Cited

U.S. PATENT DOCUMENTS

| | | | |
|---|---|---|---|
| 2012/0228999 A1* | 9/2012 | Yamamoto | F03G 7/005 |
| | | | 310/330 |
| 2018/0090242 A1 | 3/2018 | Hongo et al. | |
| 2021/0038154 A1 | 2/2021 | Tatsumi et al. | |
| 2021/0300698 A1 | 9/2021 | Kaneko et al. | |

FOREIGN PATENT DOCUMENTS

| | | | | |
|---|---|---|---|---|
| JP | 2016211997 A | * | 12/2016 | |
| JP | 2018-47633 A | | 3/2018 | |
| WO | WO 2019/188341 A1 | | 10/2019 | |
| WO | WO 2020/027246 A1 | | 2/2020 | |
| WO | WO-2020066237 A1 | * | 4/2020 | ............. H02N 13/00 |

OTHER PUBLICATIONS

International Preliminary Report (PCT/IPEA/409) for PCT/JP2021/034900 dated Aug. 26, 2022.
International Search Report for PCT/JP2021/034900 mailed on Dec. 7, 2021.
Written Opinion of the International Searching Authority for PCT/JP2021/034900 mailed on Dec. 7, 2021.

* cited by examiner

(iii)

ELECTROSTATIC ATTRACTOR AND ROBOT HAND COMPRISING SAME

TECHNICAL FIELD

The present invention relates to an electrostatic attractor capable of attracting and grasping (which may be referred to as "attraction grasping" below) an object to be attracted using electrostatic force, and to a robot hand comprising the same.

BACKGROUND ART

In recent years, so-called wearable new electronic products that can be worn on the body or the like are on the market, and there is an increasing momentum for collecting biological data with various sensors, for example. There is also a growing momentum to expand the target of attraction to various objects, other than the living body (for example, human skin), by improving followability to flexible objects so that the electronic products readily adapt to the objects. Here, conventional robot grippers use a vacuum and a mechanical actuator to attract, grasp, and transport objects, although there have been concerns that the vacuum and the mechanical actuator can easily damage soft objects and cause deformation such as crushing. Accordingly, it can be considered to use pads having adhesive means, such as adhesives or pressure-sensitive adhesives, for the purpose of transporting soft objects in particular. However, using adhesives, pressure-sensitive adhesives, or the like, requires a lot of time and effort for attachment and detachment, and there is also a disadvantage that repeated use is difficult. For this reason, technology using electrostatic force is increasingly adopted in view of easy attachment and detachment, or other aspects.

Incidentally, an electrostatic chuck has conventionally been used to attract an object to be attracted with electrostatic force. As a specific example of a dielectric layer (insulator) of the electrostatic chuck, a polyimide film or a polyethylene terephthalate (PET) film is preferably used. However, when the electrostatic chuck is used to attract a soft object such as a living body (for example, the skin of the human body), it is presumed that reverse electrification is generated on the surface of the electrostatic chuck, and this causes a decrease in attraction force, although the detailed cause is unknown. It is confirmed that the generation of reverse electrification and the decrease in attraction force are more prominent than when a semiconductor substrate or the like is used.

Another reason is that the conventional electrostatic chuck requires sufficient contact area between an object to be attracted and the chuck in order to obtain sufficient attraction force. Accordingly, in order to increase the contact area, both the object to be attracted and the chuck have been flat and uniform in the past. In this regard, the surface of a soft object such as a living body is typically soft and curved to some extent, and therefore it was found out that the conventional electrostatic chuck comes into contact with only part of the attraction surface and does not provide sufficient attraction force.

Furthermore, in addition to the issues of reverse electrification and contact area, the principle of attraction of the conventional electrostatic chucks, that is so-called Coulomb force, is fundamentally weak force (a few $g/cm^2$), which makes it difficult to obtain an effective force usable to attract a soft object such as a living body. Therefore, additional stronger force, generated at the interface between the chuck surface and the living body, such as the Johnson-Rahbeck effect, is needed. As the electrostatic chucks using the Johnson-Rahbeck effect, those using ceramic have mostly been used, though there have been few reports on those using a polymeric organic substance which can be expected to provide followability high enough to secure the contact area with an attraction object.

As a solution to these conventional issues, the inventors of the present invention have conducted extensive studies about means that can attract objects to be attracted that are soft and have a certain amount of water and oil, especially the skin of human, using electrostatic force, and have proposed an attraction pad using a resin film having a specific tensile modulus and a specific volume resistivity value as an attraction surface for the object to be attracted (Patent Literature 1). The applicants of the present invention have similarly proposed an electrostatic attractor which uses a resin film having a specific tensile modulus and a specific volume resistivity value as an attraction surface for objects to be attracted, the attraction surface attracting even a sheet-like object to be attracted having high insulation characteristic, such as fabrics, and which incorporates the arrangement and shape of an electrode (Patent Literature 2).

CITATION LIST

Patent Literature

Patent Literature 1: International Publication No. WO 2019/188341

Patent Literature 2: International Publication No. WO 2020/027246

SUMMARY OF THE INVENTION

Technical Problem

As a result of further examination about the attraction pad in Patent Literature 1 and the electrostatic attractor in Patent Literature 2 by the inventors of the present invention, following issues were confirmed with respect to a metal foil specifically adopted as an electrode for the attraction pad and for the electrostatic attractor. Specifically, according to the examination by the inventors of the present application, the metal foil is relatively rigid and hard to deform. Furthermore, the metal foil is relatively poor in anti-kink characteristic, so that a fold is easily formed. Accordingly, it is difficult for the metal foil to adapt to an object, so that the contact area decreases, and this results in concern about reduction in attraction force.

Accordingly, the inventors of the present invention further examined the improvement of the attraction pad and the electrostatic attractor which were developed earlier. As a result, the inventors have found out that using a predetermined fiber component that is subjected to electroconductive treatment as an electrode can provide durability high enough to eliminate the above concern, and can also exhibit effective attraction gripping force for various soft objects to be attracted including the skin of the human body and the like, and have thus completed the present invention.

Therefore, an object of the present invention is to provide an electrostatic attractor using electrostatic force, the electrostatic attractor having higher durability than before, achieving more reliable attraction and gripping of various soft objects to be attracted, including the skin of human and the like, and also contributing to transportation of vulnerable items and automation thereof in a logistics field in particular.

Solution to Problem

More specifically, the summary of the present invention is as shown below.

[1] An electrostatic attractor, including: a laminate sheet formed by sequentially laminating at least a first soft polymeric organic substance, an electrode, and a second soft polymeric organic substance; and a power source device configured to apply voltage to the electrode, electrostatic force generated by applying voltage to the electrode being used to attract and grasp an object to be attracted, with one of the soft polymeric organic substances as a contact surface, in which the first soft polymeric organic substance and/or the second soft polymeric organic substance have tensile modulus of 1 MPa or more and less than 100 MPa and volume resistivity of $1\times10^8$ to $10^{13}$ Ω·cm, and the electrode is a fiber component subjected to electroconductive treatment.

[2] The electrostatic attractor according to [1], wherein the electrode is a cloth including fibers coated with metal ink, or a cloth including electroconductive fibers.

[3] The electrostatic attractor according to [1] or [2], in which bending stiffness (B) in pure bending characteristics of the electrostatic attractor measured by a KES-FB2-S tester is 0.25 gf·cm$^2$/cm or more.

[4] The electrostatic attractor according to any one of [1] to [3], in which the electrostatic attractor has compression hardness (LC) of 0.16 or less and compression energy (WC) of 0.03 gf·cm/cm$^2$ or less in a compression test measured by a KES-FB3-A tester.

[5] The electrostatic attractor according to any one of [1] to [4], in which the first soft polymeric organic substance and/or the second soft polymeric organic substance are soft polyvinyl chloride and/or polyurethane.

[6] The electrostatic attractor according to any one of [1] to [5], in which the object to be attracted is one selected from the group consisting of human skin, organs, animal skin, plants, meat and meat products, vegetable and vegetable products, fruit and fruit products, plastic containers and paper materials, or a combination thereof.

[7] The electrostatic attractor according to any one of [1] to [6], in which the electrode includes a bipolar electrode having a first electrode and a second electrode.

[8] The electrostatic attractor according to any one of [1] to [6], wherein the electrode includes a monopolar electrode.

[9] A robot hand including the electrostatic attractor according to any one of [1] to [8].

Advantageous Effects of Invention

The present invention can have excellent durability and further improve attraction retentivity using electrostatic force more than those of conventional attraction pads and electrostatic attractors. Therefore, the present invention can achieve more reliable attraction and retention of various soft objects to be attracted, including the skin of human and the like. Since chemical adhering means, such as adhesives and pressure-sensitive adhesive, is unnecessary, repeated use becomes possible. Furthermore, since release films or the like used in relation to the adhering means is also unnecessary, simplicity and cost-effectiveness are achieved. In addition, the present invention can contribute to transportation of fragile items and automation thereof in the field of logistics in particular.

BRIEF DESCRIPTION OF DRAWINGS

FIG. 1 is a schematic diagram illustrating aspects of a laminate sheet of a positive electrode or a negative electrode, in which FIG. 1(*i*) is a plan view, FIG. 1(*ii*) is a sectional explanatory view along A-A cross section for illustrating the state before lamination, and FIG. 1(*iii*) is a sectional explanatory view along B-B cross section for illustrating the state before lamination, with white arrows in FIGS. 1(*ii*) and 1(*iii*) indicating an attraction surface for an object to be attracted.

DESCRIPTION OF EMBODIMENT

Hereinafter, the present invention will be described in detail.

Figure 1:
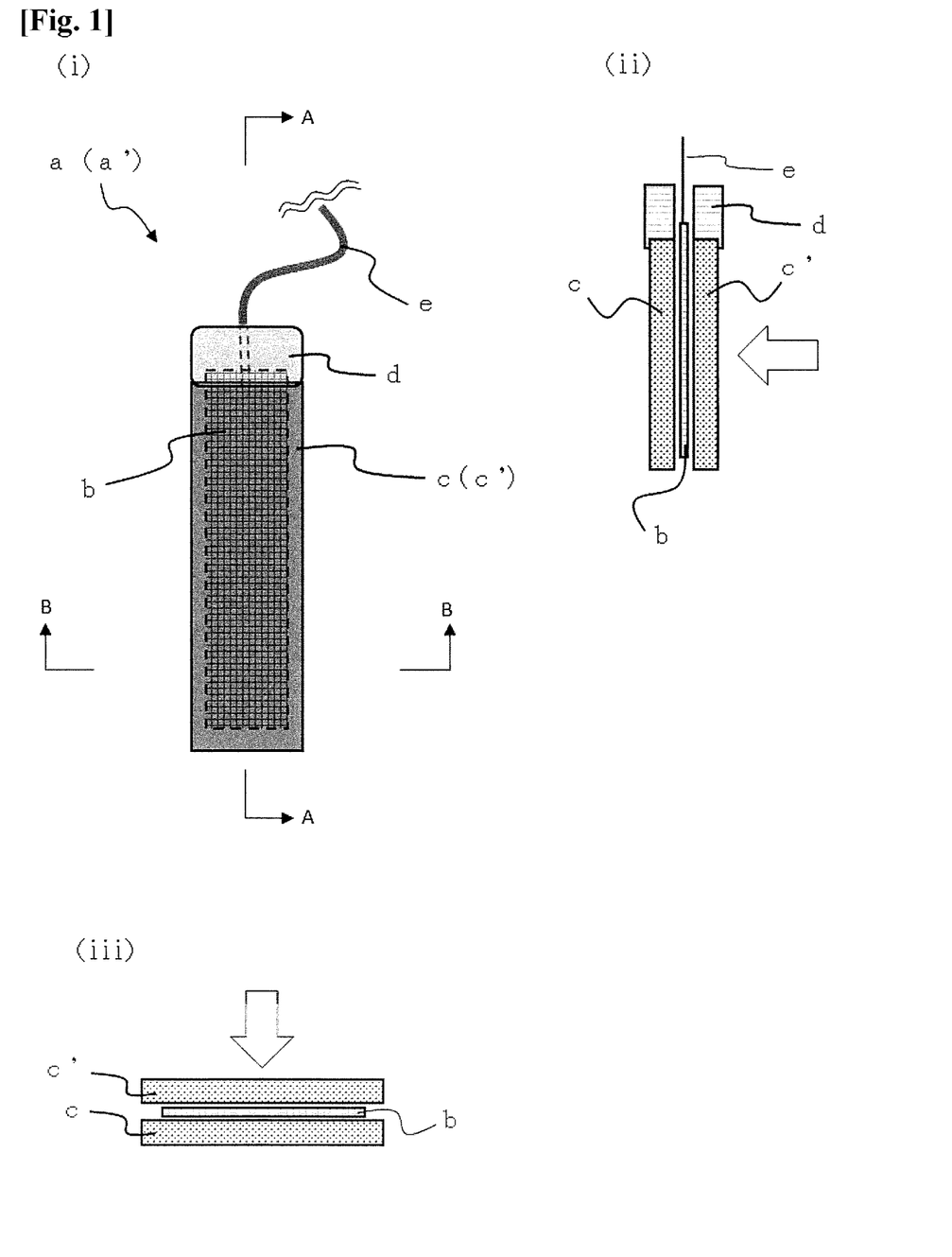

As shown in FIG. 1, an electrostatic attractor of the present invention includes a laminate sheet formed by sequentially laminating at least a first soft polymeric organic substance, an electrode, and a second soft polymeric organic substance, with the electrode being interposed between the soft polymeric organic substances, and a power source device (not illustrated) configured to apply voltage to the electrode. Hereinafter, each component member will be described in detail.

<Electrode>

The electrode used in the present invention may be bipolar or monopolar. For example, in the case of the bipolar electrode, a plurality of laminate sheets (electrostatic attractors) shown in FIG. 1 is used. For the electrode, a fiber component imparted with electroconductivity is used. Here, the "fiber component" includes any item formed by processing fibers of any kind, regardless of natural or chemical, into a thin shape, and is preferably a cloth. Here, the "cloth" may include any cloth, regardless of woven or non-woven, such as knit and felt. Specifically, the cloth preferably conforms to the definition of "cloth" in JIS Standard L 0206: 1999 Glossary of terms used in textile industry (woven fabrics) No. 1283. As described above, such fiber components are less rigid than conventionally used metal foils and the like, so they are more susceptible to deformation and excellent in anti-kink characteristic. Accordingly, when such a fiber component, used with a resin film described later, is made to contact with (attract) an object to be attracted, the fiber component is presumed to have excellent followability to the shape of the object to be attracted, have a sufficient contact area, and fit well to the object to be attracted.

Here, a well-known method can be adopted for the electroconductive treatment of the fiber component. Examples of the method may include a method of coating a cloth or the like with electroconductive ink, a method of forming electroconductive fiber by weaving the electroconductive fiber into a cloth or the like, a method of forming a cloth or the like by making a material including a electroconductive substance, such as carbon, in a fiber form, and a method of forming a cloth or the like by weaving metal yarn as fiber. By using the electrode configured as the fiber component subjected to electroconductive treatment, the force to attract and grasp the object to be attracted can be improved as compared with the case of using conventional metal foil or the like. As for the electroconductivity of the electrode in this case, the resistivity is preferably 10 Ω·m or less.

The electrode of the present invention having such a configuration preferably has a thickness of 1 to 200 µm, though the thickness is appropriately adjusted according to the purpose of use or application of the electrostatic attractor. When the thickness is less than 1 µm, the electrostatic attractor is more susceptible to deformation, which may cause disconnection of the electrode and reduced electroconductivity. On the other hand, when the thickness exceeds 200 µm, the hardness of the electrode tends to increase, which may inhibit the flexibility of the entire electrostatic attractor, resulting in poor followability to the object to be attracted.

Furthermore, since the electrode of the present invention is such a fiber component, softness (compression characteristic) and bending characteristics can be evaluated by following methods.

Specifically, Kawabata evaluation system (KES system) has been known as a method for objectively evaluating the texture of cloth products, and this evaluation is conducted by using measuring instruments and measurement methods made by Kato Tech Co., Ltd. Among these methods, in the present invention, following 1) bending characteristics and 2) compression characteristics are evaluated for electrostatic attractors formed with electrodes different from each other, and resultant difference is confirmed as described in the example described later.

1) Bending Characteristics

For measurement of the bending characteristics, a KES-FB2-S pure bending tester manufactured by Kato Tech Co., Ltd. is used. With this evaluation, it is possible to measure parameters, such as rigidity and recoverability (so-called strength of "stiffness", etc.) of the electrode itself and the electrostatic attractor of the present invention.

Figure 3:
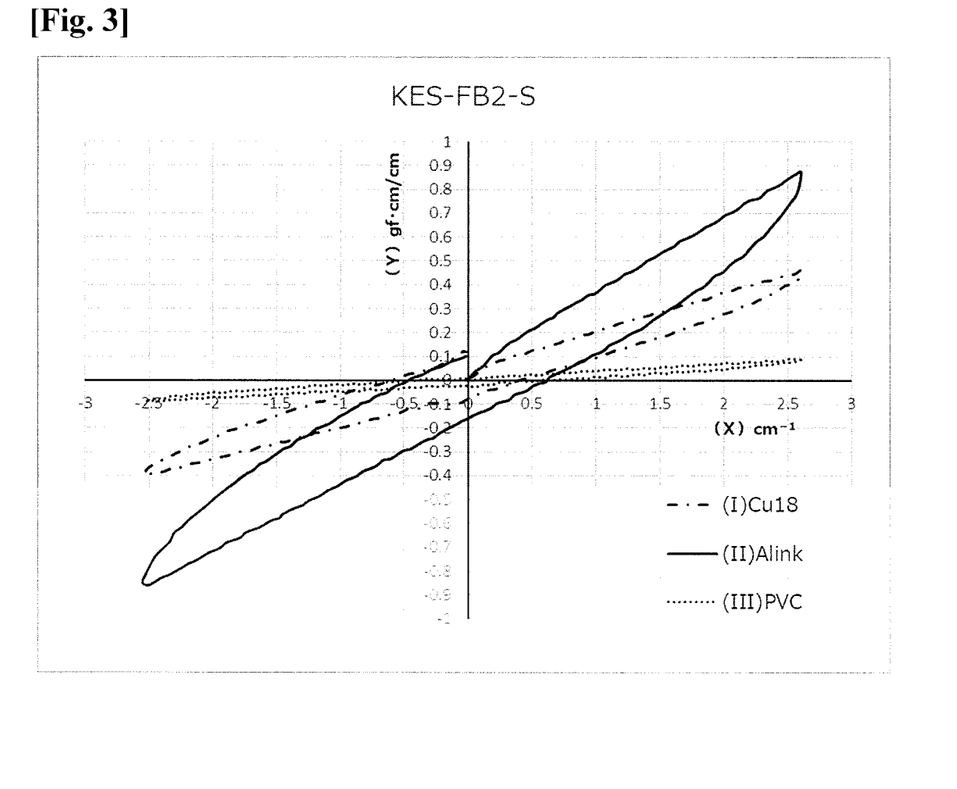
FIG. 3 is a graph showing the result of a pure bending test of the respective laminate sheets (electrostatic attractors) shown in FIG. 2 with a KES-FB2-S tester.
Figure 5:
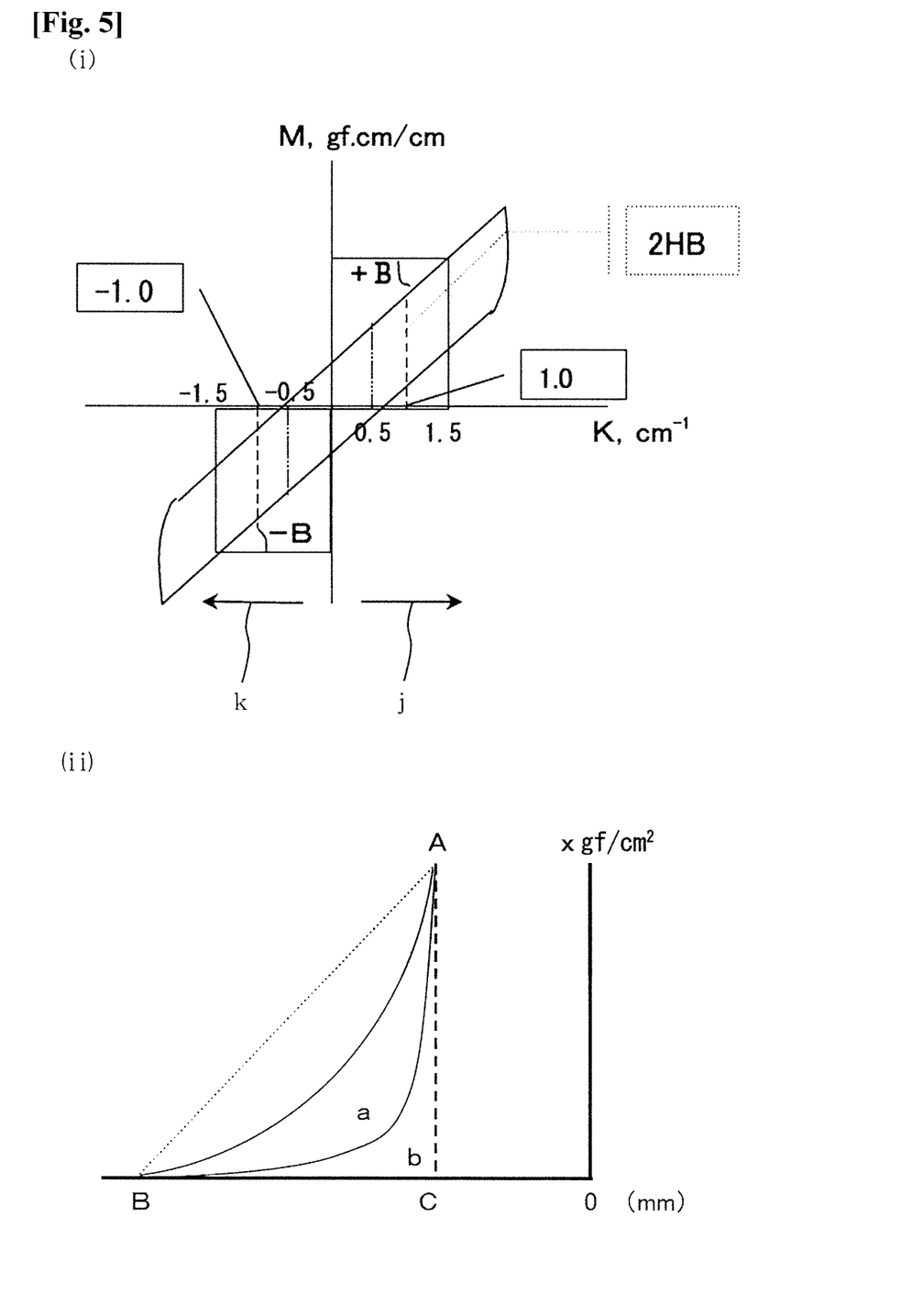
FIG. 5 shows an analysis example of each of the bending test and compression test in KES evaluation (source: Kato Tech Co., Ltd.), in which FIG. 5(*i*) is used in the KES-FB2-S pure bending test, and FIG. 5(*ii*) is used in the KES-FB3-A compression test.

In a specific example, an electrode test piece of 20 cm×20 cm is set in a tester, and relationship between curvature and bending moment is measured when the test piece is pressed and when the test piece is returned under a maximum curvature of 2.5 cm$^{-1}$. An example of the graph obtained by the measurement is provided as a hysteresis curve as shown in FIG. 3. A specific analysis method for the hysteresis curve is shown in FIG. 5($i$), in which "bending stiffness" (B), defined from inclination with curvature of 0.5 to 1.5 or −0.5 to −1.5, correlates with softness and rigidity that a person feels when bending an object. The larger a value B is, the higher the bending stiffness is, and the smaller the value B is, the lower the bending stiffness is. "Bending recoverability" (2HB), defined by hysteresis (width) with curvature of 1.0 or −1.0, is the size of the area surrounded by a line. This is correlated with a tactile sense relating to the force of an object to return back to its original state after a person bends the object, the force corresponding to recoverability (elasticity). The higher (wider) a 2HB value is, the lower the recoverability is, and the smaller (narrower) the 2HB value is, the higher the recoverability is.

According to the hysteresis curve obtained by this method, it is understood, regarding the bending characteristics (B and 2HB), that bending stiffness (B) of the electrostatic attractor using a prescribed electrode of the present invention is preferably 0.25 gf·cm$^2$/cm or more in average value (absolute value). It is also understood that the bending recoverability (2HB) is preferably 0.25 gf·cm/cm or more in average value (absolute value).

On the other hand, although there is no upper limit for B and 2HB, the average (absolute) upper limit of B is preferably 0.40 gf·cm$^2$/cm or less, and is more preferably 0.35 gf·cm$^2$/cm or less, according to the result of the example described later. The average (absolute) upper limit of 2HB is preferably 0.40 gf·cm/cm or less, and is more preferably 0.35 gf·cm/cm or less.

2) Compression Characteristics

The compression characteristics are measured by using a KES-FB3-A compression tester manufactured by Kato Tech Co., Ltd. This evaluation provides data on compression rigidity, compression energy, and recoverability of fabric products or the like, which makes it possible to understand the characteristics that influence "fullness and softness", "smoothness", and "anti-drape stiffness" of the texture.

Figure 4:
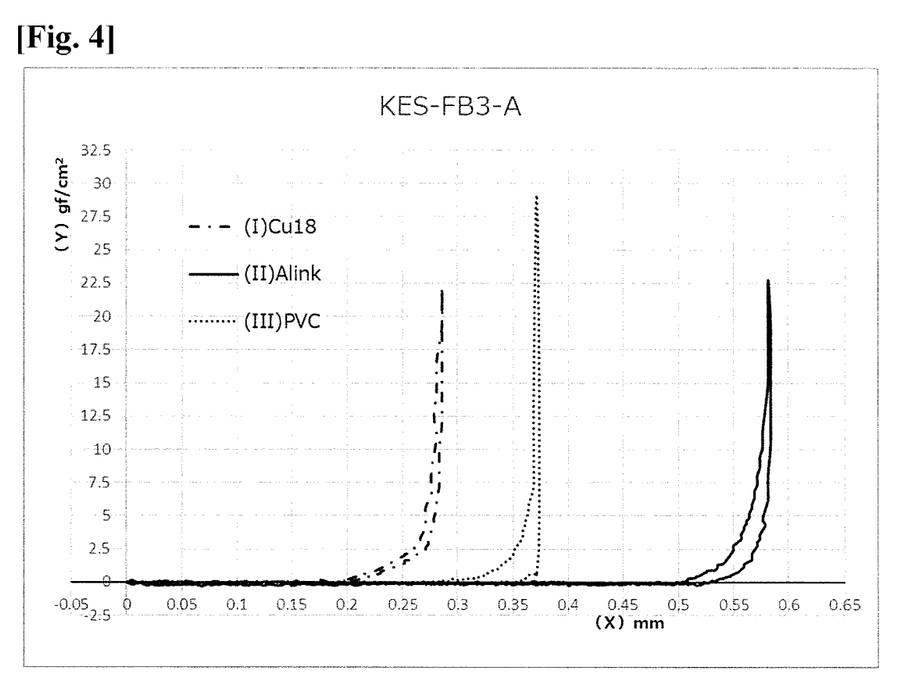
FIG. 4 is a graph showing the result of a compression test of the respective laminate sheets (electrostatic attractors) shown in FIG. 2 with a KES-FB3-A tester.

In a specific example, an electrode test piece of 20 cm×20 cm is inserted between steel plates having circular surfaces of 2 cm$^2$ in the tester, and is compressed under compression speed of 50 sec/mm and maximum compression load (pressure) of 50 gf/cm$^2$. In this case, measurement is performed in a compression direction, with the thickness (displacement amount) between the steel plates being set to x (mm), the load (pressure) being set to y (gf/cm$^2$), and the position of a point where the load (pressure) is detected being set to x=0. The recovery process is also measured at the same speed. An example of the graph obtained by this measurement is shown in FIG. 4. A specific analysis method of the graph is shown in FIG. 5($ii$). With use of the area of a triangular ABC, the area of a region a+b, and the area of a region b as shown in FIG. 5, the characteristics of LC (compression hardness), WC (compression energy) and RC (compression recoverability) are defined by following expressions, respectively. As the LC (compression hardness) is closer to 1, the compression hardness is higher, and as the LC is smaller, the compression hardness is lower in early stage. In addition, as the value of WC (compression energy) is larger, compression is more easily performed in most cases. Furthermore, as the compression RC (recoverability) is closer to 100%, the recoverability can be considered to be higher. For example, for the compression softness that can be obtained in sensory evaluation, LC and WC are referred. As the compression softness of a cloth is higher, the cloth is more easily collapsed. When the value of LC is smaller, and the value of WC indicates a larger value, the cloth has compression softness.

$$LC \text{ (compression hardness)}=(\text{area of } a+b)/(\text{area of triangle } ABC)$$

$$WC \text{ (compression energy)}=\text{area of } a+b$$

$$RC \text{ (compression recoverability)}=(\text{area of } b)/(\text{area of } a+b)$$

In the electrostatic attractor of the present invention, it is important to increase friction force with an object. The compression characteristics are also important, and LC (compression hardness) and WC (compression energy) are important in particular. This is considered to be because the contact area with the object increases as the flexibility in a compression direction increases. As for the compression characteristics obtained by such a method, it is understood that the electrostatic attractor using the prescribed electrode in the present invention preferably has compression hardness (LC) of 0.16 or less in average value. More preferable LC is 0.120 or more and 0.16 or less. It is also understood that the compression energy (WC) is preferably 0.030 gf·cm/cm$^2$ or less in average value. More preferable WC is 0.015 gf·cm/cm$^2$ or more and 0.030 gf·cm/cm$^2$ or less.

Specifically, as for the compression characteristics obtained by such a method, it was found that the electrostatic attractor using the prescribed electrode in the present invention has the largest displacement amount and the highest softness in the vertical direction, among those evaluated in the example. In other words, it is understood that using the prescribed electrode in the present invention provides such unique characteristics that strong "stiffness" is seen in the pure bending test while high softness is seen in the vertical direction, as compared with the cases where a copper foil or the like is used as the electrode.

<Soft Polymeric Organic Substance>

The first and second soft polymeric organic substances used in the present invention are used such that one of or both the surfaces are used to make contact with (attract) an object to be attracted. Here, examples of "soft polymeric organic substances" to be used may include resin films, and cured materials made by curing jelly-like (gel-like) polymer organic substances, though the resin films are preferably used.

At least the soft polymeric organic substance, for use in the contact surface (also referred to as the attraction surface hereinafter) with the object to be attracted, needs to have volume resistivity of $1 \times 10^8$ to $10^{13}$ Ω·cm. When the volume resistivity of the soft polymeric organic substance of the contact surface exceeds $1 \times 10^{13}$ Ω·cm, the attraction force against the object to be attracted decreases, so that the electrostatic attractor becomes, for example, susceptible to the influence of its own weight. As a result, the electrostatic attractor may fail to attract and retain, and may be dropped or peeled off. Meanwhile, when the volume resistivity is less than $1 \times 10^8$ Ω·cm, the attraction force, acting on the object to be attracted, itself is estimated to increase. However, this volume resistivity is not preferable because small discharges continuously occur between the electrostatic attractor and the object to be attracted, which may cause itching and pain, when used on the human body in particular, and may damage the skin (the object to be attracted). In view of both development of the attraction force and safety, the volume resistivity is preferably $1 \times 10^{10}$ to $10^{12}$ Ω·cm.

The volume resistivity of the soft polymeric organic substances that are not used in the contact surface with the object to be attracted can be set as appropriate. However, there is concern that the current that is to flow to the object to be attracted through the soft polymeric organic substance on the contact surface side may flow to the soft polymeric organic substance on the opposite side of the contact surface. Therefore, the volume resistivity of the soft polymeric organic substance on the opposite side is preferably equal to or larger than the volume resistivity of the soft polymeric organic substance on the contact surface side.

It is also necessary to keep tensile modulus (Young's modulus) of at least the soft polymeric organic substance of the contact surface with the object to be attracted at 1 MPa or more and less than 100 MPa. In the case of targeting an object to be attracted that is relatively soft, such as human skin, in particular, the soft polymeric organic substance is required, although the detailed principle is not clear, to be able to attract the object to be attracted while following the shape thereof, and to minimize repulsion (stress) generated inside the electrostatic attractor while attracting the object to be attracted, so as to maintain (grasp) the attracting state. To satisfy these requirements, the tensile modulus (Young's modulus) of at least the soft polymeric organic substance of the contact surface side is set within the range described above. The tensile modulus (Young's modulus) of the soft polymeric organic substance, on the opposite side of the contact surface with the object to be attracted, can be set as appropriate. However, in order not to interfere with the flexibility of the entire electrostatic attractor, the tensile modulus is preferably within or smaller than the similar tensile modulus (Young's modulus) range described above.

In order to secure insulation, attraction followability to an object to be attracted, and attraction force for the soft polymeric organic substances, the thickness of both the first and second soft polymeric organic substances can be adjusted as appropriate. However, each thickness may preferably be 20 to 200 μm. More preferably, each thickness may be 50 to 100 μm. When the thickness is less than 20 μm, dielectric breakdown is likely to occur, and when pinholes are formed thereby in the resin film, the soft polymeric organic substances may fail to function as the electrostatic attractor. On the other hand, when the thickness exceeds 200 μm, the attraction followability to the object to be attracted may deteriorate, and distance to the object to be attracted may increase, resulting in decrease in attraction force. The soft polymeric organic substances may each be used alone, or a plurality of soft polymeric organic substances may be used in combination. Even in the case of a plurality of soft polymeric organic substances, it is preferable that the total thickness falls within the range described above.

In the case of using the soft polymeric organic substances as described above as resin films, specific examples of the first and second resin film may be the same or be different from each other. The specific examples may include polyimide, polyethylene terephthalate (PET), nylon, polypropylene, polyurethane, soft polyvinyl chloride, and polyvinylidene chloride, or those processed (e.g., mixed with fillers) to adjust their electroconductivity. In the case of the resin films used in the contact surface with the object to be attracted in particular, polyurethane and soft polyvinyl chloride are preferable, and soft polyvinyl chloride is more preferable in order to keep the volume resistivity and the tensile modulus within the prescribed range.

Specific examples of cured materials, made by curing jelly-like (gel-like) polymer organic substances, may include cured materials made of ultraviolet curing-type liquid silicon rubber (for example, polydimethylsiloxane).

<Laminate Sheet>

At least such first and second soft polymeric organic substances and the electrode are used to form a laminate sheet by lamination. The electrode needs to be interposed between the soft polymeric organic substances so as not to be exposed. Specific methods include a method in which an electrode is interposed between the soft polymeric organic substances and then fused with heat and pressure. Alternatively, bonding sheets, adhesives or pressure-sensitive adhesive may be used for adhesion as necessary. However, when the electrostatic attractor, having another material inserted as an adhesive layer, is deformed and expanded/contracted, the inserted another material may inhibit deformation and expansion/contraction or may cause removal of the adhesive surface. Accordingly, a method involving fusing by using thermoplasticity of the resin film may be more preferable.

Here, as the laminate sheet, a sheet formed into, for example, a flat plate by laminating soft polymeric organic substances and an electrode may be used as it is, or the shape of the laminate sheet or the like may be changed appropriately according to the state of an object to be attracted. Specifically, when the object to be attracted is in a sheet shape, the electrostatic attractor may also be in the sheet shape or a flat plate shape. On the other hand, in the case of an electrostatic attractor having too many circles and corners to sufficiently secure a single contact surface (contact point), it is preferable, for example, to form the electrostatic attractor into the shape of a hand so that the hand can grasp or hold the object to be attracted. With such configuration, it is presumed that sufficient contact surface (contact point) can be secured, and the effect of the flexibility (shape followability) of the electrostatic attractor can be provided, so that the attraction retentivity is effectively expressed.

The laminate sheet can be used by appropriately adjusting the overall thickness according to an object to be attracted, though the thickness is preferably about 40 μm to 1000 μm. When the thickness of the laminate sheet is too small, it is presumed that flexibility and shape followability are improved, through there is a risk of damage due to excessive bending. When the thickness is too large, it may affect the compression characteristics of the laminate sheet and increase the rigidity (bending rigidity), which may inhibit the flexibility of the entire electrostatic attractor.

For the laminate sheet, it is also preferable that the contact surface with an object to be attracted (the contact surface in the soft polymeric organic substances) have fine unevenness. While it has been confirmed that the soft polymeric organic substances and the fiber component, which is an electrode, are soft, and laminating these components generates fine unevenness on the surface of the soft polymeric organic substances, it is presumed that when the attraction surface attracts an object to be attracted, the attraction surface is deformed, which can provide the effect similar to that of a plurality of suckers. In order to provide the soft polymeric organic substances with such fine unevenness, the surface state of the soft polymeric organic substances themselves may be changed (e.g., processed). Preferably as described above, in combination with the surface unevenness provided for the fiber component that is used as an electrode, fine unevenness may be provided for the contact surface in the soft polymeric organic substances.

<Power Source Device>

After the laminate sheet is formed as described above, the power source device is needed to apply voltage to the electrode to generate electrostatic force. The power source device to be used may be a device that can be connected to the electrode of the laminate sheet via a connection terminal and a switch (both not illustrated), similar to those used in typical electrostatic attraction structures, and that can generate high direct current voltage. Potential difference to be generated may be about 500 to 5000 V, and if necessary, the power source device may include a boost circuit (high voltage generation circuit) that can boost the voltage to a desired voltage. In order to apply the electrostatic attractor of the present invention to the skin of the human body in particular, design thereof is preferably in consideration of following (1) to (3). That is, (1) To provide as high a voltage as possible in order to generate sufficient attraction force.

(2) To adjust potential of the human body to as low as 0 V. This is because when the potential applied to the human body is biased toward either positive or negative, static electricity accumulates in the human body, and the human body is shocked at the time of discharge.

(3) Never to allow current large enough to harm the human body to flow.

It is preferable to determine, under the design concepts (1) to (3) and in consideration of (2) and (3) in particular, the voltage to be applied to the electrostatic attractor. To achieve (2), it is preferable to connect an earth (grounding) to the object to be attracted (human skin) and to the ground of a voltage generation source (for example, a high voltage generation circuit) in the power source device, when a monopolar electrode layer is used. On the other hand, when a bipolar electrode layer is used, it is preferable to apply positive and negative symmetric voltages to the first and second electrodes in the electrode layer so as to ensure that the human body is as close as possible to 0 V. Furthermore, to achieve (3), it is preferable to keep output current from the power source to 0.5 mA or less. At 0.5 mA or less, the human body is normally not perceptible to the current. However, when the current is accumulated in the electrostatic attractor or the human body, and the current is discharged at once, a large current may be generated. Accordingly, it is preferable that the electrostatic capacitance of the electrostatic attractor is set to 1000 pF or less, which is similar to that of the human body, or more specifically, the electrostatic capacitance is set to about 10 pF to 100 pF, and the voltage is set within ±5000 V. This is because with such setting, even if the current should be accumulated in the human body, it amounts to 5 μC or less.

The laminate sheet and the power source device as described above constitute the electrostatic attractor of the present invention. The electrostatic attractor of the present invention may separately include a sensor or the like if necessary. For example, changes and addition of the component members, such as change of the pattern of the electrodes, may be performed as appropriate without departing from the purpose of the present invention.

As an object to be attracted that is an attraction target in the present invention, not only conductors but also paper and cloth with poor electrical conductivity can be selected. Examples of the object to be attracted may particularly include the skin of the human body, and those having the softness equivalent to the skin of the human body and having a certain surface for the electrostatic attractor to make contact with and attract, that is, for example, organs, animal skin, plants, foods such as meat and meat products, vegetables and processed vegetables, and fruits and processed fruits, plastic containers such as packs, trays and bottles for foods and for packaging, and paper materials such as cardboards. Alternatively, a combination of these may also be the attraction target. The objects to be attracted having volume resistivity of about $10^{12}$ to $10^{14}$ Ω·cm are particularly targeted for attraction. Although the detailed principle of such attraction is not clear, it is presumed that a small current is generated between the attraction surface of the electrostatic attractor (laminate sheet) and the object to be attracted, and the attraction force due to the Johnson-Rahbeck effect acts on between the attraction surface of the electrostatic attractor (laminate sheet) and the object to be attracted.

Such electrostatic attractor and the laminate sheet of the present invention are also suitably used in the fields of logistics and transportation, and can be used in the state of being incorporated into equipment and devices for transportation and gripping, such as robot hands or the like.

EXAMPLES

Hereinafter, while the preferred embodiment of the present invention is described in detail based on an example and a comparative example, the present invention is not construed in a limited manner.

<Fabrication of Electrostatic Attractor>

Example 1

First, an aluminum-coated cloth having the shape shown in FIG. 1 [Product name: Alink, available from: Alink Co., Ltd. (Address: #6401, 797 Changdaero, Seongsangu, Changwon, Gyeongnam Korea; Homepage: http://www.alink21.com), width: 35 mm, length: 119 mm, thickness: 130 μm] was prepared as an electrode. Next, two adhesive layers (manufactured by MeCan Imaging Inc., product name: MPD62, width: 40 mm, length: 123 mm, thickness: 25 μm) with the same width and length as the electrode were prepared, and arranged on the upper and lower surfaces of the electrode, respectively. The electrode was then interposed between two resin films c and c' made of soft polyvinyl chloride (both of which have volume resistivity: $1 \times 10^{10}$ Ω·cm (measured by a method described later), tensile modulus (Young's modulus): 20 to 30 MPa, and each film thickness: 100 μm) through the arranged upper and lower adhesive layers, and was pressure-bonded while being pressed to be a laminate sheet a (FIG. 1). Two laminated sheets a were prepared as a positive electrode and a negative electrode.

A power source device that applies voltage to the fabricated laminate sheets a was prepared as follows. First, connector-attached withstand voltage cables (manufactured by VONA, product name: 03-103723) were each soldered to a copper foil tape (not illustrated), the copper foil tape was applied to each end portion of the electrodes, and insulated by an insulating tape. Next, the respective connector portions were connected to a positive electrode or a negative electrode of the power source device [the power source device including a high voltage generator (±2000V output), and a power supply cable for 24 V power source] (not illustrated) to form the electrostatic attractors (positive and negative electrodes) according to the example 1.

Comparative Example 1

Two electrostatic attractors (electrostatic attractors according to a comparative example 1) connected to the positive electrode and the negative electrode were fabricated using the same procedure as in the example 1 except that a copper foil (thickness: 18 μm) having similar width and length to the electrodes in the example 1 was used as an electrode.

<Evaluation of Attraction of Electrostatic Attractor>

Figure 6:
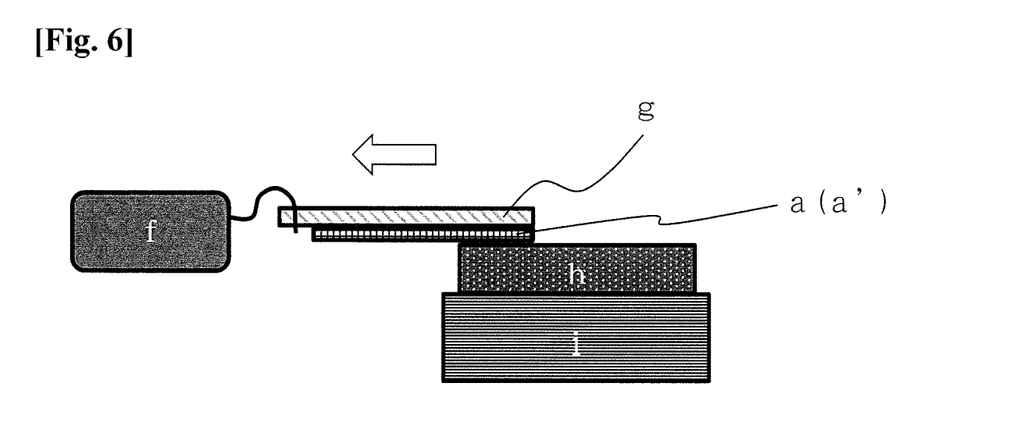
FIG. 6 is an explanatory view for illustrating an evaluation method of attraction shown in the example, with a white arrow in the drawing indicating a force gauge tensile direction.

Evaluation was conducted with the configuration as shown in FIG. 6.

1. Two electrostatic attractors (positive and negative electrodes) fabricated as described above were attached and fixed to a PVC plate (contact insulation) of 84 mm wide×135 mm long.

2. Next, a silicon plate having 120 mm square was fixed to a temperature control device, with temperature being set to 25° C., and a chamber (an acrylic box in which humidity and target temperature can be controlled) was set to humidity of 50%. The PVC plate with the electrostatic attractors was placed on the hook of a force gauge, and the PVC plate was disposed on a silicon plate so that the electrostatic attractors come into contact with the silicon plate (contact area: 70 mm wide×109 mm long).

The electrostatic attractors and the silicon plate were held as they were for a while until the temperature and humidity became constant.

3. The force gauge was set to a max value (peak value) mode, then returned back to "0" and set. Voltage application from the power source device was started (±2 kV), and after 10 seconds, the force gauge was pulled 30 mm in an arrow direction in FIG. 6 at speed of 1 mm/s.

4. The max value was recorded. The same operation was repeated (number of repetitions: 20).

5. The procedure 3 was repeated without voltage application (number of repetitions: 20).

The procedures 1 to 5 were performed with the electrostatic attractors in the example 1 and the electrostatic attractors in the comparison example 1, and an average of the measurement values (an average of 20 measurement values) was defined as the attraction force of each electrostatic attractor. The result is shown in Table 1.

TABLE 1

| | voltage applied | | voltage applied | |
| --- | --- | --- | --- | --- |
| | Average value (gf/cm$^2$) | Standard deviation (gf/cm$^2$) | Average value (gf/cm$^2$) | Standard deviation (gf/cm$^2$) |
| Example 1 | 10.294 | 0.768 | 0.630 | 0.065 |
| Comparative example 1 | 3.645 | 0.548 | 0.280 | 0.080 |

(Chamber temperature and humidity: 25° C./50%, applied voltage: +2 kV, attraction area: W 70 mm × L 109 mm)

<Evaluation Based on KES System>

Evaluation based on the KES system was entrusted to an external testing organization [Local independent administrative institution: Kanagawa Institute of Industrial Science and Technology (KISTEC)], where 1) KES-FB2-S pure bending test and 2) KES-FB3-A compression test were performed.

Figure 2:
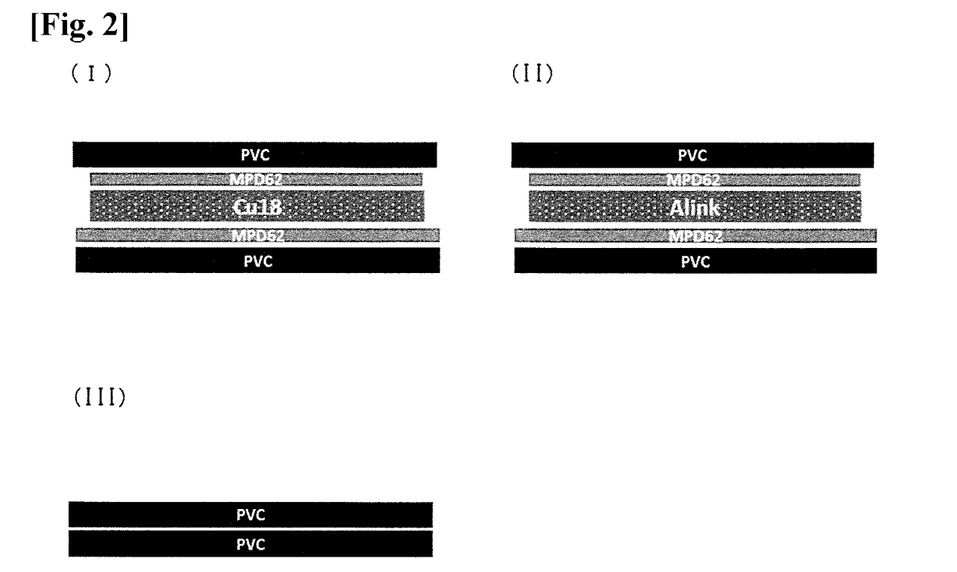
FIG. 2 shows sectional schematic views of the respective laminate sheets (electrostatic attractors) (I) to (III) used in KES evaluation shown in an example.

As samples, electrostatic stators (I) to (III) shown in FIG. 2 were used. In the sample (I), the electrode was made of a copper foil (18 μm thick), in the sample (II), the electrode was Alink that is the same as described above, and in the sample (III), the electrode was not used and only a PVC tape was used. In FIG. 2, "PVC tape" is expressed as "PVC". In FIG. 2, "MPD62" and "PVC" (PVC tape) represent the resin films including the adhesive layer MPD62 and the soft polyvinyl chloride, respectively.

The resulting graphs are shown in FIG. 3 and FIG. 4, respectively, and the analysis method is shown in FIG. 5. In FIG. 3, a horizontal axis (X) represents "curvature" and a vertical axis (Y) represents "bending moment". In FIG. 4, the horizontal axis (X) represents "thickness" (displacement) and the vertical axis (Y) represents "pressure". In FIG. 4, graph lines (I) to (III) appear at different positions on the horizontal axis (X axis). The difference is due to the difference in distance from the compression sensor to the sample surface, and has no particular significance. The initial setting at the time of measurement (for example, the height of the sensor) is adjustable.

Table 2 summarizes B (bending stiffness) and 2HB (bending recoverability) in the KES-FB2-S pure bending test, and LC (compression hardness), WC (compression energy) and RC (compression recoverability) in the KES-FB3-A compression test.

The respective test conditions are as follows.
1) KES-FB2-S Pure Bending Test
Sensitivity: standard
Direction: WARP
Number of repetitions: 1
SENS: 2×1
Measurement cycle: One cycle
Sample width: 20 cm
Maximum curvature: 2.51/cm
2) KES-FB3-a Compression Test
Sensitivity: standard
Number of repetitions: 1
SENS: 2×5
Speed: 50 sec/mm
Capture interval: standard
Sample width: 20 cm
Maximum load (pressure): 50 gf/cm$^2$

TABLE 2

| KES | Characteristic value | Sample (I) | Sample (II) | Sample (III) |
|---|---|---|---|---|
| KES-FB2-S | B(+side)(gf · cm$^2$/cm) | 0.1474 | 0.3021 | 0.0298 |
| | B(−side)(gf · cm$^2$/cm) | 0.1259 | 0.2777 | 0.0273 |
| | B(average)(gf · cm$^2$/cm) | 0.1367 | 0.2899 | 0.0286 |
| | 2HB(+side)(gf · cm/cm) | 0.1133 | 0.2507 | 0.0281 |
| | 2HB(−side)(gf · cm/cm) | 0.1168 | 0.2507 | 0.0268 |
| | 2HB(average)(gf · cm/cm) | 0.1151 | 0.2507 | 0.0275 |
| KES-FB3-A | LC | 0.175 | 0.158 | 0.119 |
| | WC(gf · cm/cm$^2$) | 0.031 | 0.028 | 0.014 |
| | RC(%) | 51.61 | 39.29 | 64.29 |

According to the result of Table 2, it can be found that the electrostatic attractor (the sample II shown above) of the present invention using a prescribed electrode has bending stiffness (B) of 0.25 gf·cm$^2$/cm or more and bending recoverability (2HB) of 0.25 gf·cm/cm or more in the KES-FB2-S pure bending test. In the KES-FB3-A compression test, it can be found that the electrostatic attractor has compression hardness (LC) of 0.16 or less and compression energy (WC) of 0.030 gf·cm/cm$^2$ or less.

REFERENCE SIGNS LIST a . . . Laminate sheet, a' . . . Electrostatic attractor, b . . . Electrode, c . . . First soft polymeric organic substance, c' . . . Second soft polymeric organic substance, d . . . Insulating seal tape, e . . . Power source cable, f . . . Force gauge, g . . . PVC plate, h . . . Silicon plate, i . . . Temperature control device, j . . . Outward (direction), k . . . Homeward (direction).

The invention claimed is:

1. An electrostatic attractor, comprising:
a laminate sheet formed by sequentially laminating at least a first soft polymeric organic substance, an electrode, and a second soft polymeric organic substance; and
a power source device configured to apply voltage to the electrode, electrostatic force generated by applying voltage to the electrode being used to attract and grasp an object to be attracted, with one of the soft polymeric organic substances as a contact surface, wherein
the first soft polymeric organic substance and/or the second soft polymeric organic substance have tensile modulus of 1 MPa or more and less than 100 MPa and volume resistivity of $1\times10^8$ to $10^{13}$ Ω·cm, and
the electrode is a fiber component subjected to electroconductive treatment.

2. The electrostatic attractor according to claim 1, wherein the electrode is a cloth including fibers coated with metal ink, or a cloth including electroconductive fibers.

3. The electrostatic attractor according to claim 1, wherein bending stiffness (B) in pure bending characteristics of the electrostatic attractor measured by a KES-FB2-S tester is 0.25 gf·cm$^2$/cm or more.

4. The electrostatic attractor according to claim 1, wherein the electrostatic attractor has compression hardness (LC) of 0.16 or less and compression energy (WC) of 0.03 gf·cm/cm$^2$ or less in compression test measured by a KES-FB3-A tester.

5. The electrostatic attractor according to claim 1, wherein the first soft polymeric organic substance and/or the second soft polymeric organic substance are soft polyvinyl chloride and/or polyurethane.

6. The electrostatic attractor according to claim 1, wherein the object to be attracted is one selected from the group consisting of human skin, organs, animal skin, plants, meat and meat products, vegetable and vegetable products, fruit and fruit products, plastic containers and paper materials, or a combination thereof.

7. The electrostatic attractor according to claim 1, wherein the electrode comprises a bipolar electrode having a first electrode and a second electrode.

8. The electrostatic attractor according to claim 1, wherein the electrode comprises a single pole electrode.

9. A robot hand comprising the electrostatic attractor according to claim 1.

10. The electrostatic attractor according to claim 1, wherein the electrode is a fiber component comprising fibers coated with an electroconductive ink, a fiber component comprising electroconductive fibers, a fiber component by making a material including an electroconductive substance in a fiber form, or a fiber component made by weaving metal yarn as fiber.

11. The electrostatic attractor according to claim 1, wherein the fiber component comprises natural or synthetic fibers, and is formed by processing the fibers into a thin shape.

12. The electrostatic attractor according to claim 1, wherein the fiber component comprises woven cloth, non-woven cloth, knit and felt.

* * * * *